(12) United States Patent
Suzuki et al.

(10) Patent No.: US 11,904,247 B2
(45) Date of Patent: Feb. 20, 2024

(54) INFORMATION PROCESSING APPARATUS AND IMAGE DISPLAY METHOD FOR SUPERIMPOSING ANOTHER IMAGE ON A CONTENT IMAGE

(71) Applicant: Sony Interactive Entertainment Inc., Tokyo (JP)

(72) Inventors: Shogo Suzuki, Tokyo (JP); Takuma Oiwa, Tokyo (JP); Masashi Takeuchi, Tokyo (JP); Hiroki Hirakawa, Tokyo (JP); Steven Trombetta, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 58 days.

(21) Appl. No.: 17/616,716

(22) PCT Filed: May 29, 2020

(86) PCT No.: PCT/JP2020/021312
§ 371 (c)(1),
(2) Date: Dec. 6, 2021

(87) PCT Pub. No.: WO2020/246377
PCT Pub. Date: Dec. 10, 2020

(65) Prior Publication Data
US 2022/0326815 A1 Oct. 13, 2022

Related U.S. Application Data

(60) Provisional application No. 62/857,956, filed on Jun. 6, 2019.

(51) Int. Cl.
*G06F 3/0482* (2013.01)
*A63F 13/87* (2014.01)
(Continued)

(52) U.S. Cl.
CPC ............ *A63F 13/87* (2014.09); *G06F 3/0482* (2013.01); *G06F 3/0484* (2013.01); *H04L 65/403* (2013.01)

(58) Field of Classification Search
CPC .... A63F 2300/572; A63F 13/87; A63F 13/00; G06F 3/0484; G06F 3/0482;
(Continued)

(56) References Cited

U.S. PATENT DOCUMENTS

| 10,905,952 B2 | 2/2021 | Nomura |
| 2006/0205517 A1 | 9/2006 | Malabuyo |

(Continued)

FOREIGN PATENT DOCUMENTS

| JP | 2006247381 A | 9/2006 |
| JP | 2006350628 A | 12/2006 |

(Continued)

OTHER PUBLICATIONS

International Search Report for corresponding PCT Application No. PCT/JP2020/021312, 2 pages, dated Sep. 1, 2020.

*Primary Examiner* — Nicholas Ulrich
(74) *Attorney, Agent, or Firm* — Matthew B. Dernier, Esq.

(57) ABSTRACT

A content image display section displays a content image. A system image display section superimposes a system image on the content image and displays the images in response to a user operation. The system image display section is provided with a chat information display section for displaying information related to a voice chat. A member display section displays members of one voice chat room in which the user stays. A chat list display section displays a list of a plurality of voice chat rooms in which the user stays.

7 Claims, 11 Drawing Sheets

(51) Int. Cl.
*G06F 3/0484* (2022.01)
*H04L 65/403* (2022.01)

(58) Field of Classification Search
CPC . G06F 3/0481; G06F 3/04842; H04L 65/403; H04L 51/04; H04L 12/1813; H04L 12/1822
See application file for complete search history.

(56) References Cited

U.S. PATENT DOCUMENTS

| | | | |
|---|---|---|---|
| 2010/0041457 A1* | 2/2010 | Cook | A63F 13/533 |
| | | | 463/43 |
| 2012/0110099 A1* | 5/2012 | Fujihara | H04L 12/1818 |
| | | | 709/206 |
| 2017/0209790 A1 | 7/2017 | Nomura | |
| 2017/0209791 A1* | 7/2017 | Nomura | A63F 13/34 |
| 2018/0161683 A1* | 6/2018 | Thomas | G06F 3/013 |

FOREIGN PATENT DOCUMENTS

| | | | | |
|---|---|---|---|---|
| JP | 2016042238 A | 3/2016 | | |
| JP | 2016042338 A | 3/2016 | | |
| WO | WO-2015165358 A1 * | 11/2015 | | A63F 13/79 |

* cited by examiner

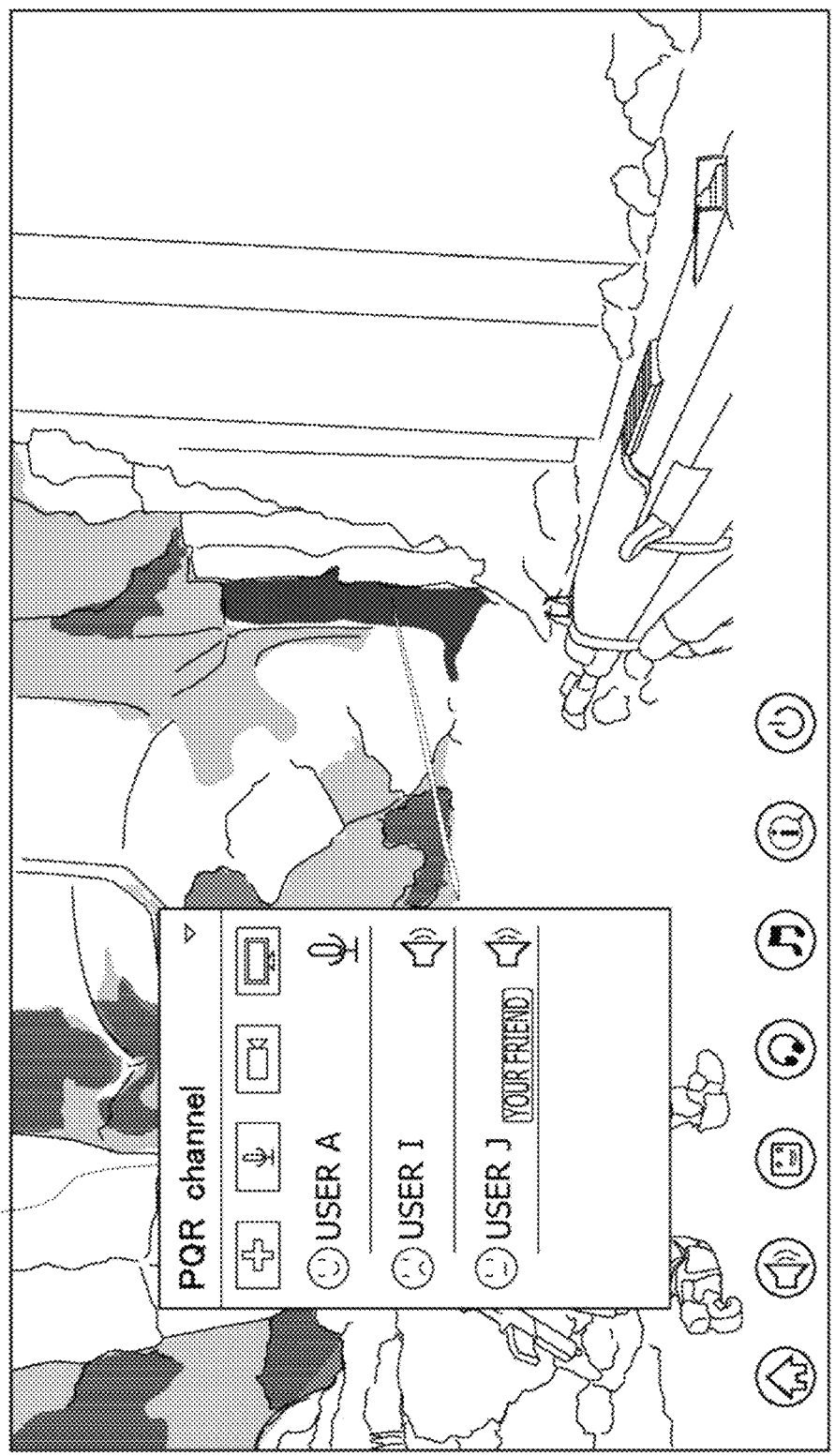

INFORMATION PROCESSING APPARATUS AND IMAGE DISPLAY METHOD FOR SUPERIMPOSING ANOTHER IMAGE ON A CONTENT IMAGE

TECHNICAL FIELD

The present disclosure relates to a technology for displaying a system image generated by system software, while superimposing the system image on a content image.

BACKGROUND ART

Patent Document 1 discloses a game device for which a user operates an input device to change a display screen from a game screen to a home screen, and further operates the input device to change the display screen from the home screen to a function screen to select a chat icon in the function screen so that a chat room entry screen is displayed.

PRIOR ART DOCUMENT

Patent Document

[Patent Document 1] Japanese Patent Laid-Open No. 2016-042238.

SUMMARY OF THE INVENTION

Problem to be Solved by the Invention

In recent years, the number of opportunities to communicate with friends over the Internet, such as playing games and chatting with friends in remote locations has been increasing. Thus simplifying the procedure for communicating with friends is required.

Means for Solving the Problem

In order to solve the above problem, an information processing apparatus according to an embodiment of the present disclosure has a content image display section that displays a content image, and a system image display section that displays a system image while superimposing the system image on the content image in response to an operation of a user. The system image display section includes a chat information display section that displays information regarding a voice chat, and the chat information display section includes a member display section that displays members of one voice chat room in which the user stays, and a chat list display section that displays a list of voice chat rooms for a different application.

Another aspect of the present disclosure includes a method for superimposing another image on a content image and includes a step of displaying the content image, a step of displaying members of the voice chat room in which the user is performing a voice chat while superimposing the members on the content image, and a step of displaying a list of voice chat rooms for a different application selectably.

It is to be noted that any combination of the above-described components and any converted expressions of the present disclosure in terms of a method, an apparatus, a system, a recording medium, a computer program, and the like are also effective as aspects of the present disclosure.

BRIEF DESCRIPTION OF THE DRAWINGS

FIG. 11 is a diagram illustrating a state in which the switching process of the voice chat room is completed.

MODE FOR CARRYING OUT THE INVENTION

Figure 1:
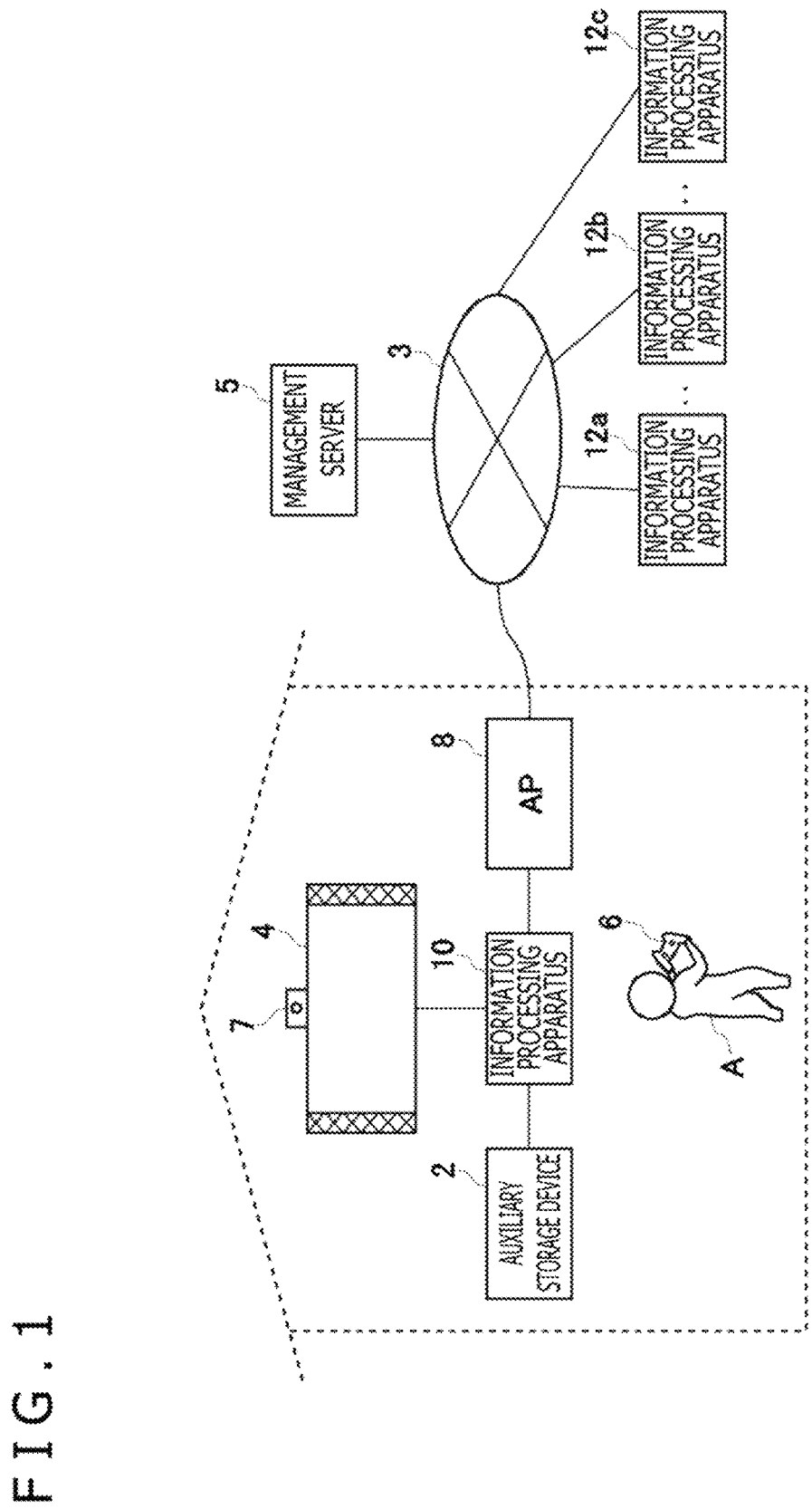
FIG. 1 is a diagram illustrating an information processing system according to an embodiment.

FIG. 1 illustrates an information processing system 1 according to an embodiment. The information processing system 1 includes an information processing apparatus 10 used by a user A, information processing apparatuses 12*a* to 12*c* used by other users (hereinafter, referred to as "information processing apparatus 12" unless otherwise distinguished), and a management server 5. The information processing apparatus 10 and the information processing apparatus 12 may be terminal devices having the same structure and function. An access point (hereinafter, referred to as "AP") 8 has a function of a wireless access point and a router, and the information processing apparatus 10 is connected to the AP 8 wirelessly or wiredly so as to be communicably connected to the management server 5 on a network 3. The information processing apparatus 10 and the information processing apparatus 12 are connected to each other via the management server 5 so that users can play games and have chats together.

An auxiliary storage device 2 is a large-capacity storage device such as a hard disk drive (HDD) or a solid-state drive (SSD), and may be a built-in storage device, or an external storage device connected to the information processing apparatus 10 via a universal serial bus (USB) or the like. An output device 4 may be a television having a display for outputting an image and a speaker for outputting sound, or may be a head mounted display. The output device 4 may be connected by a cable or wirelessly to the information processing apparatus 10. A camera 7 serving as an imaging device is provided near the output device 4, and the camera 7 captures an image of the space around the output device 4. The camera 7 may be a stereo camera.

The information processing apparatus 10 is connected to an input device 6 operated by the user wirelessly or wiredly, and the input device 6 outputs information regarding the operation of the user to the information processing apparatus 10. When receiving the operation information from the input device 6, the information processing apparatus 10 reflects the information on the processing of the system software and the application and outputs the processing result from the output device 4. In this embodiment, the information processing apparatus 10 is a game device that executes a game program or other applications, and the input device 6 may be a game controller that provides operation information of the user to the game device.

The management server 5 provides a network service to the user of the information processing system 1. The management server 5 manages a network account for identifying each user, and each user uses the network account to sign in to a network service provided by the management server 5. The management server 5 provides an environment in which users having signed in can play together and communicate with each other by a voice chat or a video chat.

Figure 2:
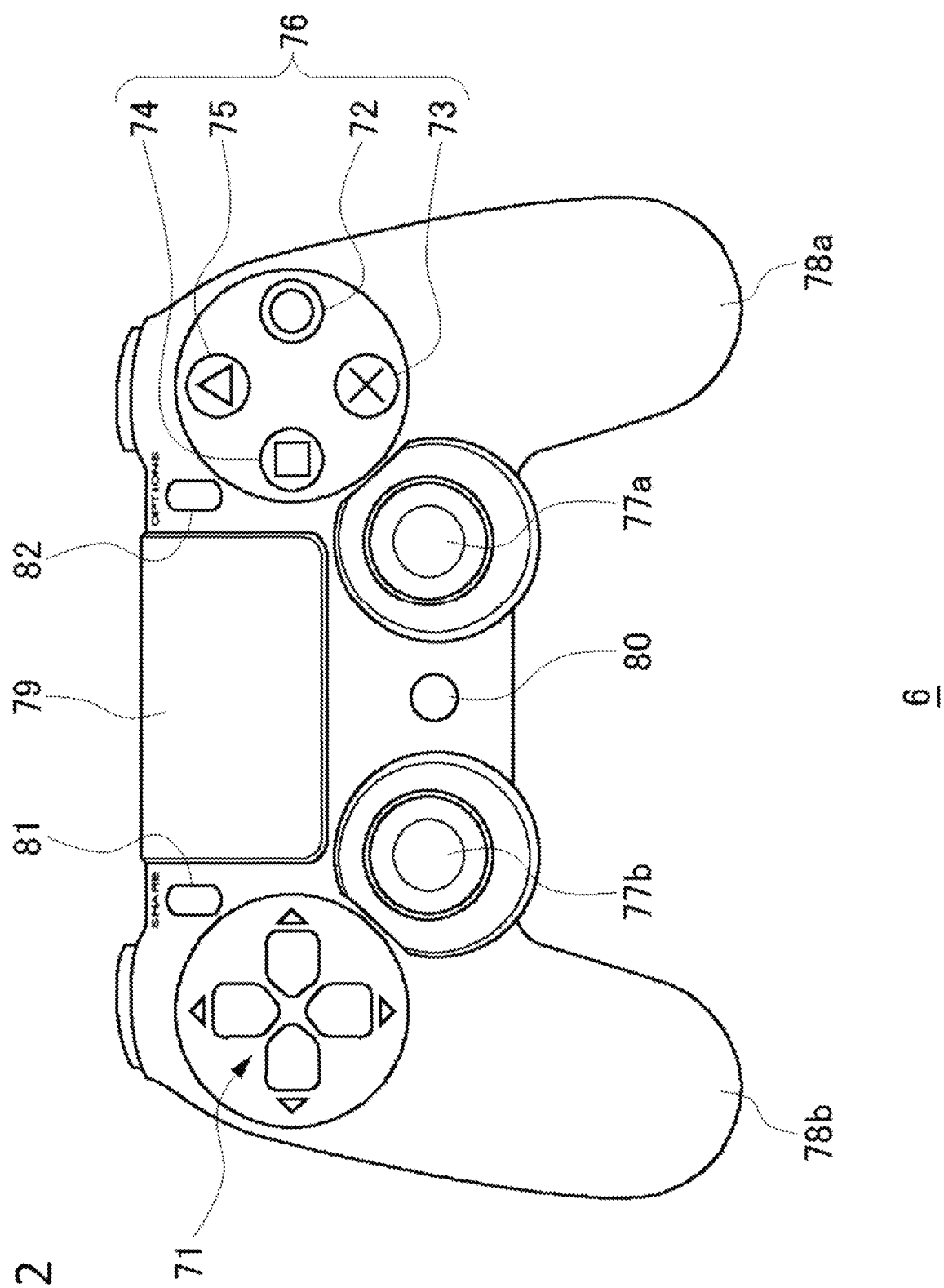
FIG. 2 is a diagram illustrating an external configuration of the upper surface of an input device.

The configuration of buttons of the input device 6 will be described. FIG. 2 illustrates an external configuration of the upper surface of the input device. The user operates the input device 6 with a left grip portion 78*b* gripped with the left hand, and a right grip portion 78*a* gripped with the right hand. The upper surface of the housing of the input device 6 is provided with a direction key 71, analog sticks 77*a* and 77*b*, four types of operation buttons 76. The four types of buttons 72 to 75 are marked with different figures in different colors to distinguish them from each other, and a red circle is illustrated on the Circle button 72, a blue cross is on the Cross button 73, and a purple square is on the Square button 74 and a green triangle is on the Triangle button 75.

A function button 80 is provided between the two analog sticks 77*a* and 77*b*. The function button 80 is used for turning on the power of the input device 6 and simultaneously activating the communication function for connecting the input device 6 and the information processing apparatus 10. After the input device 6 is connected to the information processing apparatus 10, the function button 80 is also used to superimpose a system image generated by the system software on a content image such as a game image to display the images.

A touch pad 79 is provided in a flat area between the direction key 71 and the operation buttons 76, and the touch pad 79 also functions as a push button which sinks down by the user's push, and returns to the original position when the user releases the user's hand. A SHARE button 81 is provided between the touch pad 79 and the direction key 71. The SHARE button 81 is used to input an instruction from a user to system software in the information processing apparatus 10. An OPTIONS button 82 is provided between the touch pad 79 and the operation buttons 76. The OPTIONS button 82 is used to input an instruction from a user for an application (game) executed in the information processing apparatus 10.

Figure 3:
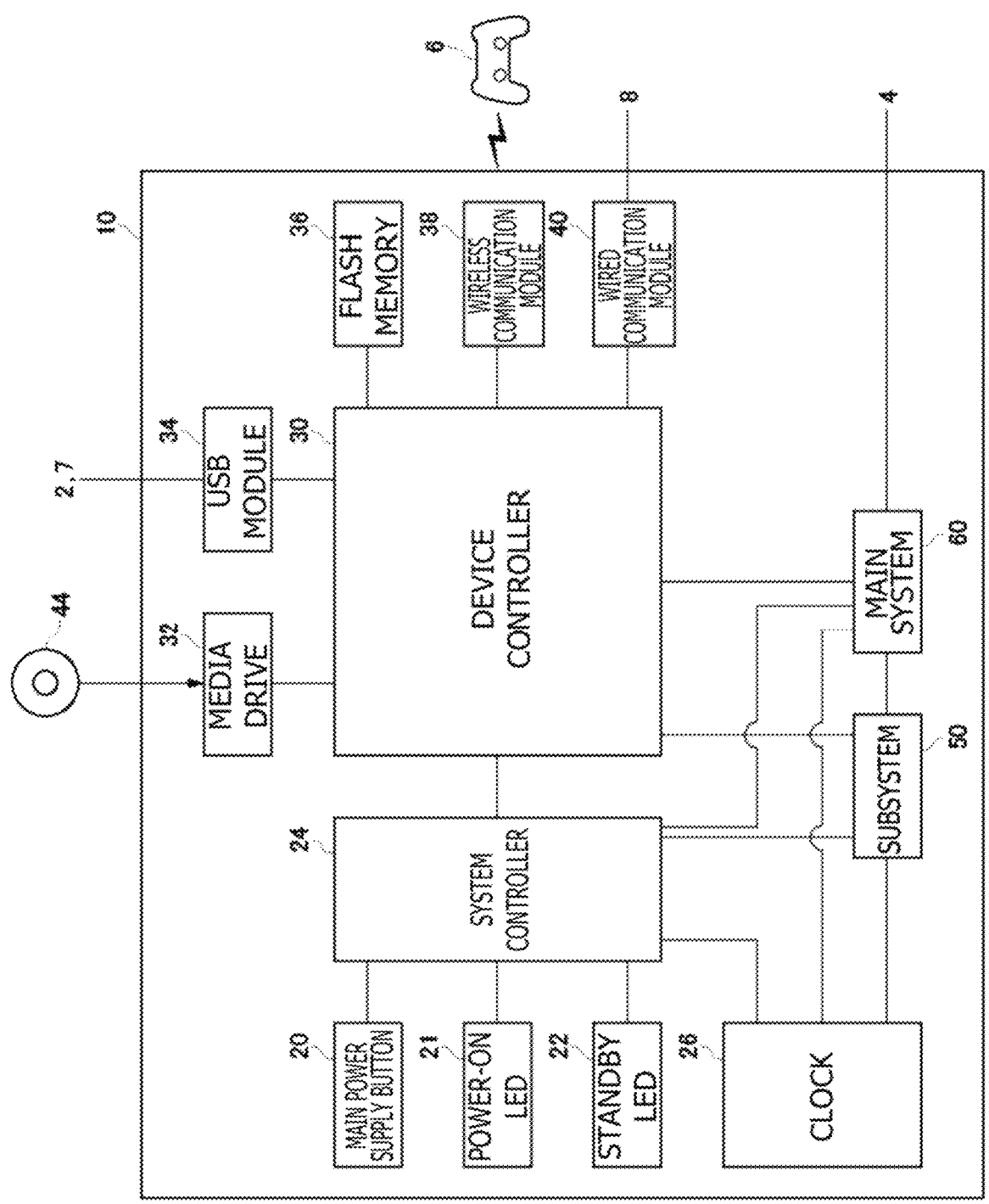
FIG. 3 is a diagram illustrating a hardware configuration of the information processing apparatus.

FIG. 3 illustrates a hardware configuration of the information processing apparatus 10. The information processing apparatus 10 includes a main power supply button 20, a power-on light-emitting diode (LED) 21, a standby LED 22, a system controller 24, a clock 26, a device controller 30, a media drive 32, a USB module 34, a flash memory 36, a wireless communication module 38, a wired communication module 40, a subsystem 50, and a main system 60.

The main system 60 includes a main central processing unit (CPU), a memory as a main storage device and a memory controller, a graphics processing unit (GPU), and the like. The GPU is mainly used for arithmetic processing of a game program. These functions may be configured as a system-on-chip and formed on one chip. The main CPU has a function of executing a game program recorded in the auxiliary storage device 2.

The subsystem 50 includes a sub CPU, a memory serving as a main storage device, a memory controller, and the like, and does not have a GPU or a function of executing a game program. The number of circuit gates of the sub CPU is smaller than the number of circuit gates of the main CPU, and the operation power consumption of the sub CPU is smaller than the operation power consumption of the main CPU. The sub CPU operates even while the main CPU is in the standby state, and its processing functions are restricted in order to reduce power consumption.

The main power supply button 20 is an input unit for performing an operation input from a user and is provided on the front surface of the housing of the information processing apparatus 10 so as to be operated to turn on or off power supply to the main system 60 of the information processing apparatus 10. The power-on LED 21 is turned on when the main power supply button 20 is turned on, and the standby LED 22 is turned on when the main power supply button 20 is turned off.

The system controller 24 detects depression of the main power supply button 20 by the user. When the main power supply button 20 is pressed while the main power supply is off, the system controller 24 obtains the pressing operation as "on instruction," and on the other hand, when the main power supply button 20 is pressed while the main power supply is on, the system controller 24 obtains the pressing operation as "off instruction."

The clock 26 is a real-time clock, generates current date and time information, and supplies the information to the system controller 24, the subsystem 50, and the main system 60. The device controller 30 is configured as a large-scale integrated circuit (LSI) that executes information transfer between devices like a southbridge. As illustrated, devices such as the system controller 24, the media drive 32, the USB module 34, the flash memory 36, the wireless communication module 38, the wired communication module 40, the subsystem 50, and the main system 60 are connected to the device controller 30. The device controller 30 absorbs the difference between the electrical characteristics of the devices and the difference between the data transfer speeds, and controls the data transfer timing.

The media drive 32 is a drive device that is equipped with and drives a read-only memory (ROM) medium 44 in which software such as games and license information are recorded, and that reads out programs, data, and the like from the ROM medium 44. The ROM medium 44 is a read-only recording medium such as an optical disk, a magneto-optical disk, and a Blu-ray disk.

The USB module 34 is a module that connects to an external device via a USB cable. The USB module 34 may be connected to the auxiliary storage device 2 and the camera 7 via a USB cable. The flash memory 36 is an auxiliary storage device constituting an internal storage. The wireless communication module 38 is a communication protocol such as a Bluetooth (registered trademark) protocol or an Institute of Electrical and Electronic Engineers (IEEE) 802.11 protocol, and communicates with the input device 6 wirelessly, for example. Incidentally, the wireless communication module 38 may be compatible with a digital mobile phone system. The wired communication module 40 performs wired communication with an external device and connects to an external network 3 via the AP 8, for example.

Figure 4:
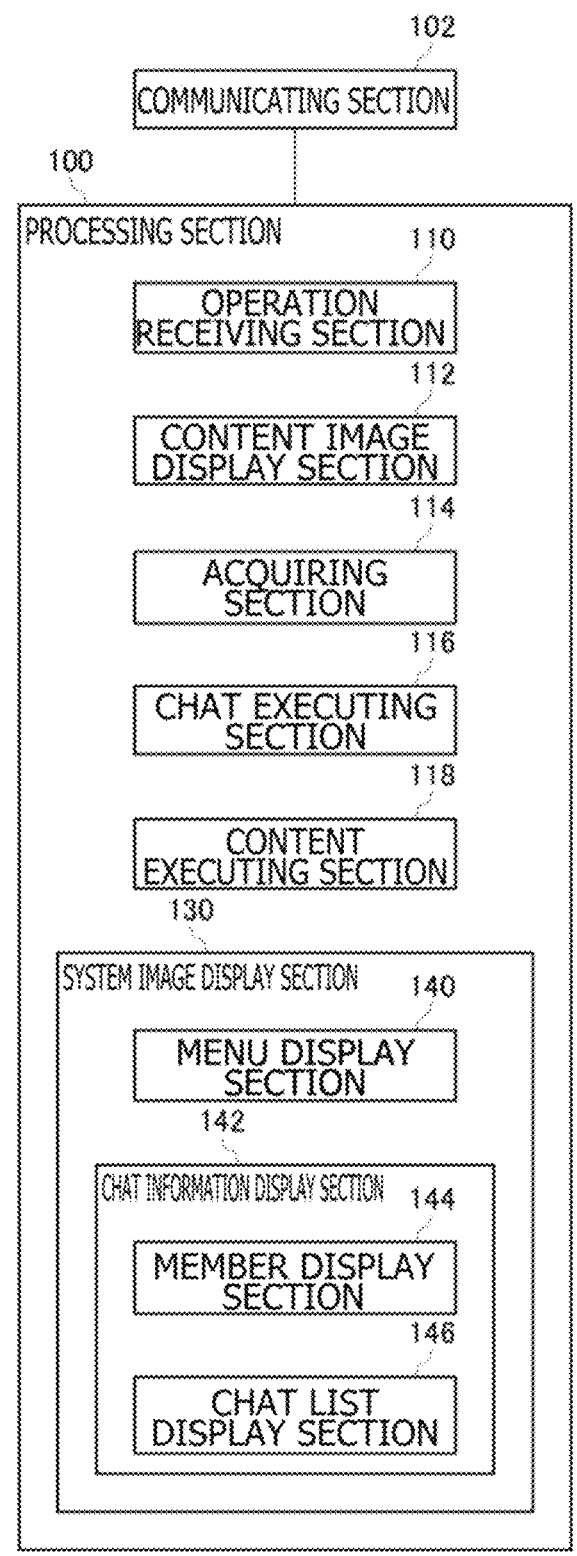
FIG. 4 is a diagram illustrating functional blocks of the information processing apparatus.

FIG. 4 illustrates functional blocks of the information processing apparatus. The information processing apparatus 10 includes a processing section 100 and a communicating section 102. The processing section 100 includes an operation receiving section 110, a content image display section 112, an acquiring section 114, a chat executing section 116, a content executing section 118, and a system image display section 130. The system image display section 130 is implemented by system software, and has a menu display section 140 and a chat information display section 142, thereby generating a system image. The system image display section 130 displays a system image while superimposing the system image on the content image in accordance with a user operation. The chat information display section 142 has a member display section 144 for displaying the members of a voice chat room, and a chat list display section 146 for displaying a list of a plurality of voice chat rooms.

In FIG. 4, each element described as a functional block that performs various processing can be configured by a circuit block, a memory, or other LSIs, in terms of hardware, and is implemented by system software and a game program or the like loaded in a memory, in terms of software. Therefore, it is understood by those skilled in the art that these functional blocks can be achieved in various forms by only hardware, only software, or a combination thereof, and thus the present invention is not limited to any of these.

The communicating section 102 receives information regarding operation by the user on buttons or the like of the input device 6, and receives information indicating the current state of the friend of the user A, data related to chatting, and the like, from the management server 5. The communicating section 102 is represented as a configuration having both functions of the wireless communication module 38 and the wired communication module 40 illustrated in FIG. 3.

The operation receiving section 110 receives a user's operation on the input device 6 via the communicating section 102. The content executing section 118 executes an application, and executes a game program to generate image data and audio data of the game in the embodiment. Incidentally, the content executing section 118 may be able to execute a plurality of applications simultaneously. The function indicated as the content executing section 118 is implemented by system software, a game program, hardware such as a GPU, and the like. Note that a game is an example of an application, and the content executing section 118 may execute an application other than games.

During the game played by the user A, the operation receiving section 110 supplies the operation information of the input device 6 to the content executing section 118, and the content executing section 118 performs arithmetic processing to move a player character in a virtual space on the basis of the operation information. The content executing section 118 includes a GPU that executes a rendering process and the like, and generates game image data from a viewpoint position (virtual camera) in the virtual space and game sound data from an arithmetic processing result in the virtual space. The content image display section 112 displays a game image from the output device 4, and a sound supplying unit (not illustrated) outputs a game sound from the output device 4.

Figure 5:
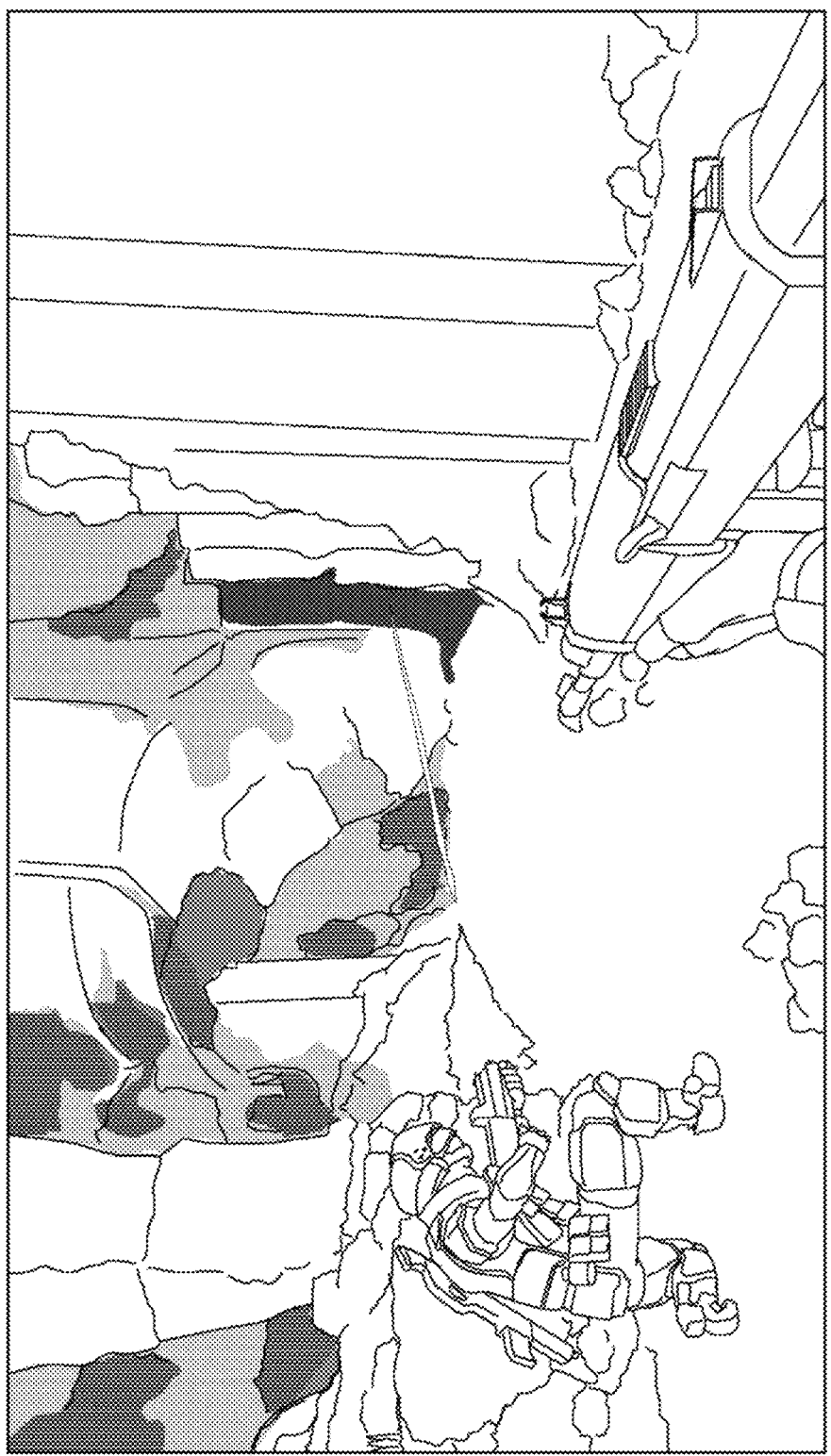
FIG. 5 is a diagram illustrating an example of a game screen.

FIG. 5 illustrates an example of a screen of the game being played by the user A. The user A plays the game by operating the input device 6 while watching the game image and listening to the game sound output from the output device 4.

The information processing apparatus 10 according to the embodiment provides a mechanism in which the user A, who is playing a game, can switch chat rooms by a simple procedure. When the user A applies a short-period push to the function button 80 of the input device 6 during the game play, the operation receiving section 110 receives the short-period push operation of the function button 80.

The operation receiving section 110 supplies the information regarding a short-period push operation of the function button 80 received during the execution of the game to the system image display section 130. The menu display section 140 superimposes a system image including a plurality of menu icons on a game image and displays the images when the operation receiving section 110 receives a predetermined operation (a short-period push operation of the function button 80) by the user A during the display of the game image, as a trigger. When the system image is superimposed on the game image and displayed, the operation receiving section 110 starts to supply operation information to be received to the system software.

Figure 6:
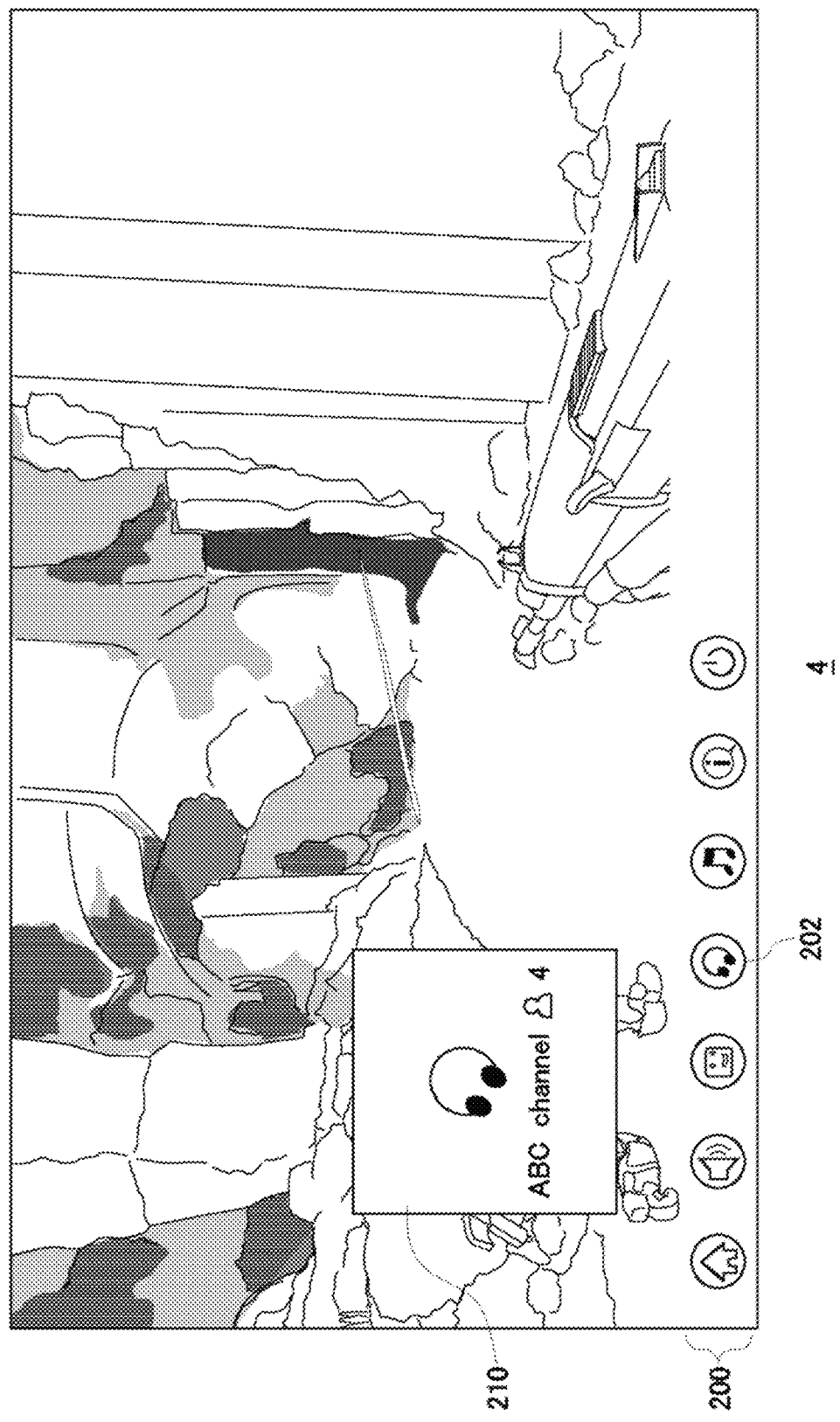
FIG. 6 is a diagram illustrating an example in which a system image is displayed while being superimposed on a game image.

FIG. 6 illustrates an example in which a system image including menu icons is superimposed on a game image and displayed. The menu display section 140 sets a function icon selection area 200 in the lower part of the display screen, and arranges a plurality of menu icons side by side. By selecting a menu icon, the user A can execute a system function associated with the icon. For example, when the user A selects a chat icon 202, a window for entering the voice chat room or establishing the voice chat room by the user is displayed, and the user A can perform a voice chat.

When the user A stays in the voice chat room, the menu display section 140 superimposes a chat image 210 indicating that the user A stays in the voice chat room on the game image and displays the images. Note that when the user is not in the voice chat room, the chat image 210 is not displayed. In the embodiment, the user A can enter a plurality of voice chat rooms, and can perform a voice chat by activating one of the rooms. The voice chat room is an application-specific voice chat room, and the user A can enter a plurality of game-specific voice chat rooms made for each game, for example. Note that the user A may be able to enter in a voice chat room that is not related to the game. In any case, the user A can enter a plurality of voice chat rooms so as to be able to enjoy a chat in a favorite room.

The menu display section 140 superimposes a system image including a plurality of menu icons and the chat image 210 on the game image and displays the images, so that the user A can execute a desired system function and can easily access information related to the voice chat. When the user A operates to select the chat image 210, the operation receiving section 110 receives operation information indicating that the chat image 210 is selected, and the chat information display section 142 displays information related to the voice chat on the game image.

Figure 7:
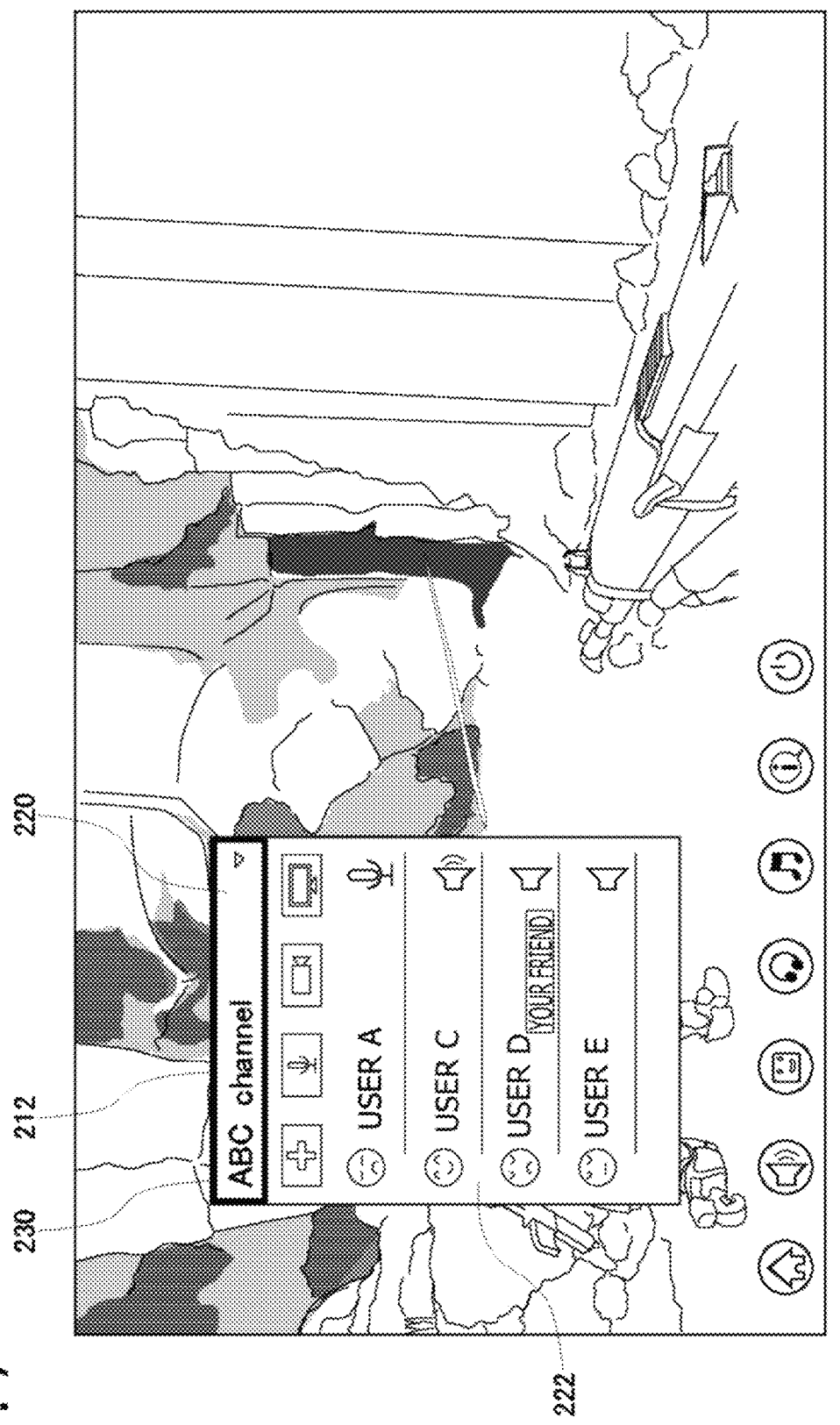
FIG. 7 is a diagram illustrating an example of a chat window.

FIG. 7 illustrates an example of a chat window 212. A channel display area 220 is provided in the upper part of the chat window 212, and the channel name of the voice chat room currently active is displayed. The channel name may be called a room name, and can be freely set by the user who has established the voice chat room. Although the user A can enter a plurality of voice chat rooms, the place where a voice chat can be performed with a chat member is limited to one room.

The chat executing section 116 executes a process related to the voice chat by the user A. A chat application may be preinstalled in the information processing apparatus 10 according to the embodiment. The chat executing section 116 of the embodiment activates only one voice chat room from among a plurality of voice chat rooms in which the user A stays. Activating one voice chat room means that the chat executing section 116 allocates resources such as microphones necessary for the voice chat to the only one voice chat room. In the state illustrated in FIG. 7, the chat executing section 116 activates the voice chat room with the channel name "ABCchannel" and stops chatting on other channels.

The member display section 144 displays the members of one voice chat room in which the user stays in a member list display area 222. The member display section 144 displays the members of the active voice chat room displayed in the channel display area 220 in the member list display area 222 so that the user A can easily confirm the members who are currently doing voice chats. Incidentally, an icon indicating the state of each member is displayed in the member list display area 222 in association with the member name, and the user A can instantly check the state of each member.

Information regarding the chat is acquired from the management server 5 by the acquiring section 114. The acquiring section 114 may periodically acquire information related to the chat from the management server 5, or may acquire the information from the management server 5 when a member or the like in the chat room has changes in the management server 5.

The chat window 212 includes a selection frame 230. When switching the chat room to be activated, the user A sets the selection frame 230 to the channel display area 220 and operates the decision button of the input device 6. At this time, the operation receiving section 110 receives the operation information, and the chat list display section 146 displays a list of a plurality of voice chat rooms in which the user A stays.

Figure 8:
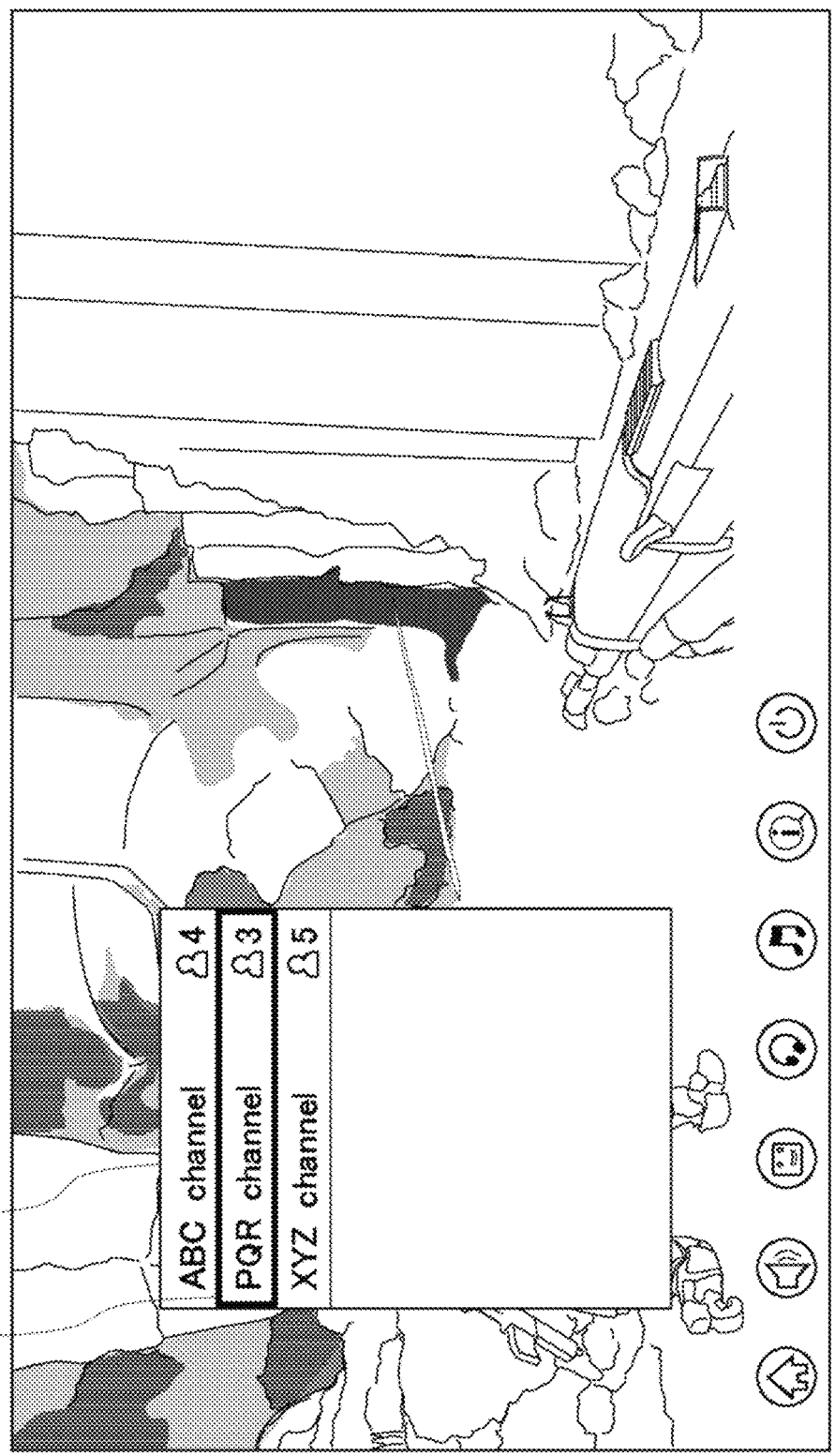
FIG. 8 is a diagram illustrating a display example of a chat list.

FIG. 8 illustrates a display example of a chat list. The chat list display section 146 displays a list of a plurality of voice chat rooms in which the user A stays in the chat window 212. In this example, the user A has entered voice chat rooms for three different applications. The user A can enter only one voice chat room per application. For example, when the content executing section 118 is executing a plurality of applications, the user A may be able to enter a voice chat room for each application. When the user A sets the selection frame 230 to the chat room to be activated and operates the decision button of the input device 6, the operation receiving section 110 accepts the operation information. The operation receiving section 110 supplies the information indicating that "PQRchannel" has been selected to the chat information display section 142.

Figure 9:
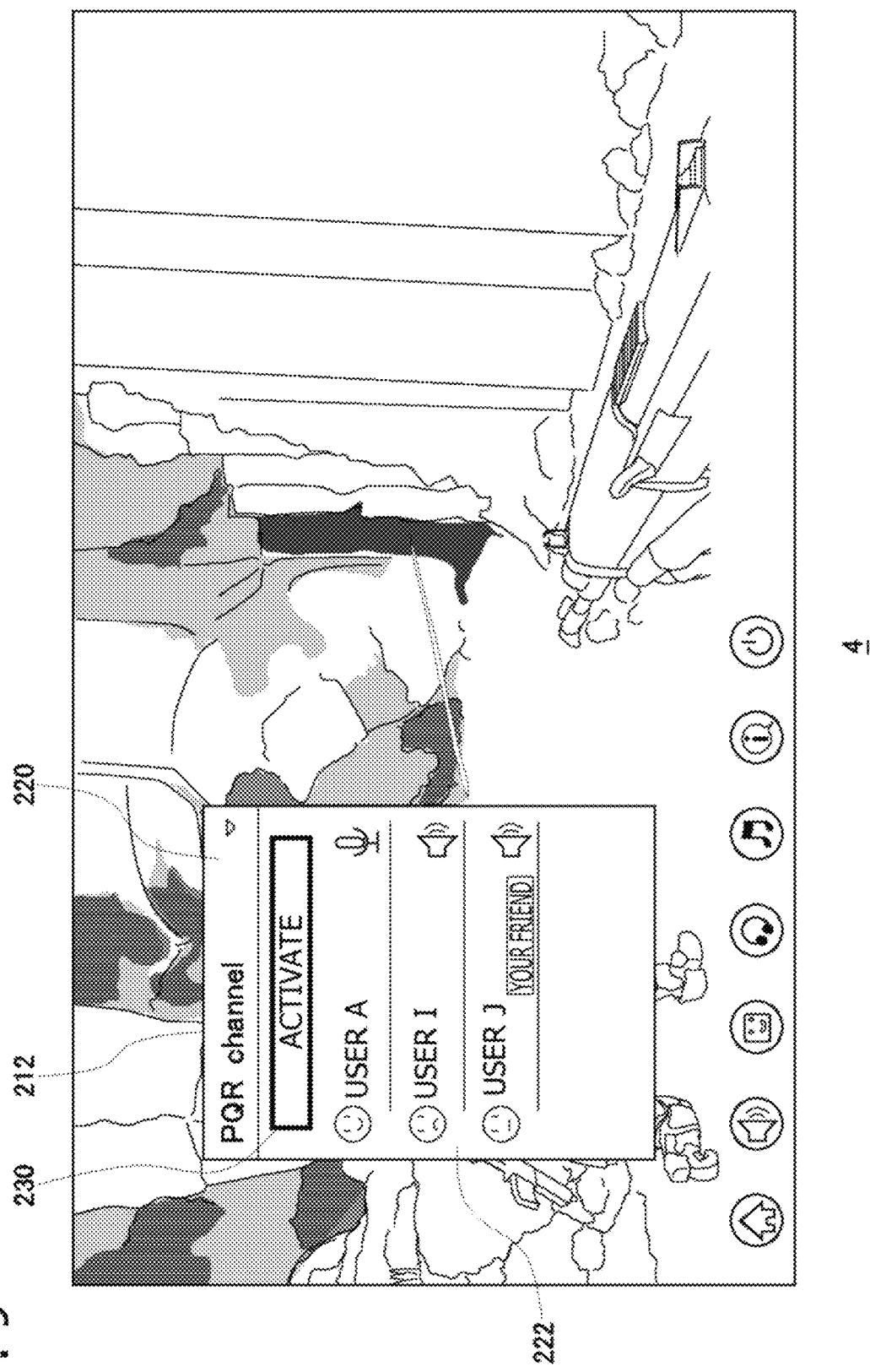
FIG. 9 is a diagram illustrating an example of the chat window.

FIG. 9 illustrates an example of the chat window 212. In the channel display area 220, a channel name "PQRchannel" is displayed. The member display section 144 displays the members of "PQRchannel" in the member list display area 222. The member display section 144 displays the members of the voice chat room displayed in the channel display area 220 in the member list display area 222 so that the user A can easily confirm the members of the voice chat room. When the user A activates the voice chat room of "PQRchannel," the user operates the decision button of the input device 6 after setting the selection frame 230 to the "activate" button.

Figure 10:
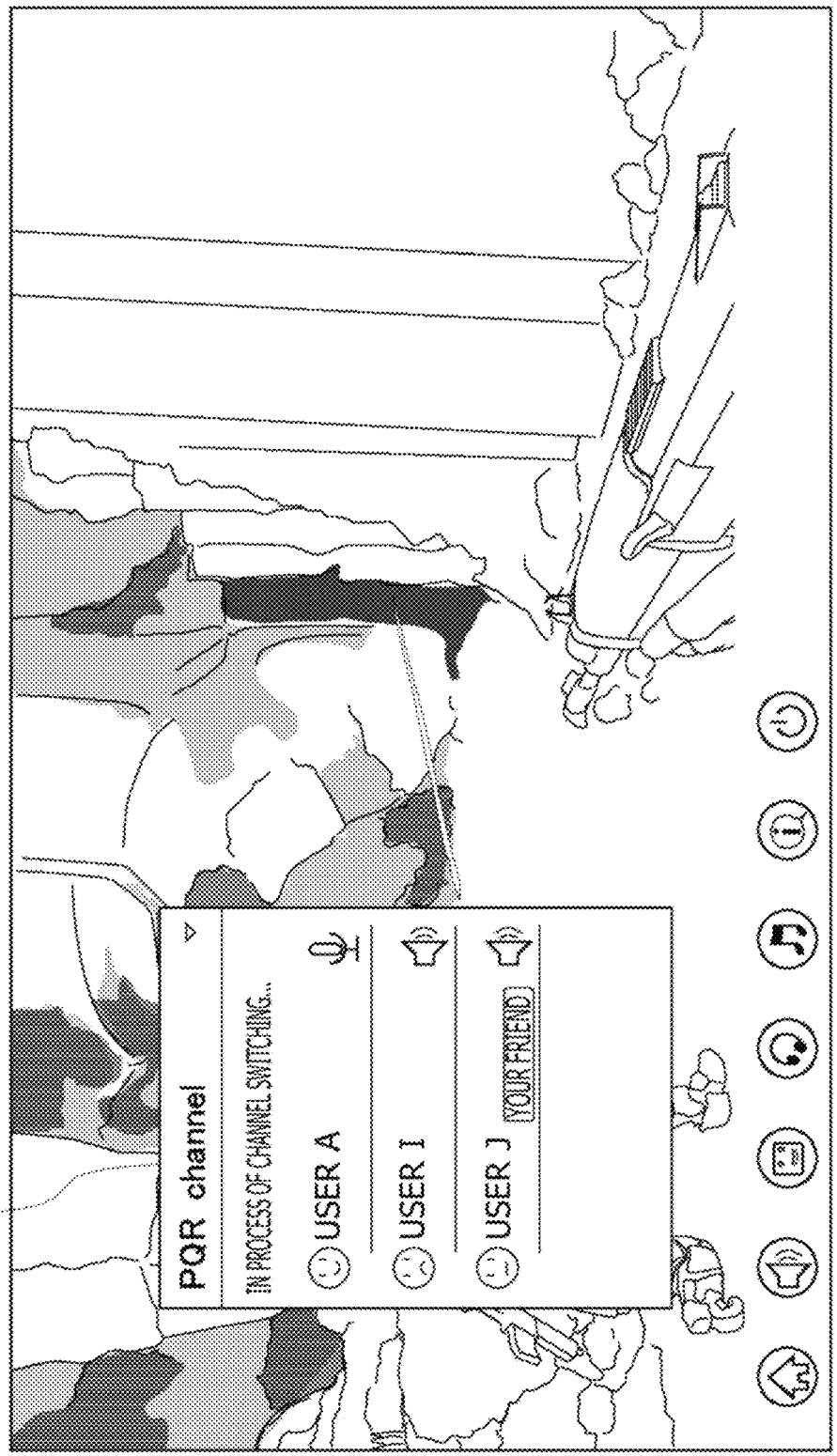
FIG. 10 is a diagram illustrating a state in which a switching process of a voice chat room is being performed.

FIG. 10 illustrates a state in which the chat executing section 116 is performing the process of switching voice chat rooms. The chat executing section 116 releases the resources such as the microphones assigned to "ABCchannel" and reassigns the resources to "PQRchannel." This allows the user A to perform a voice chat in the chat room of "PQRchannel."

FIG. 11 illustrates a state where the switching process of the voice chat room is completed. The user A can enjoy a voice chat with a user I and a user J. As described above, in the information processing system 1, the user A can switch the voice chat rooms to be activated by a simple operation while staying in the plurality of voice chat rooms.

Hereinabove, the present disclosure has been described on the basis of the embodiments. The embodiments illustrate examples, and it is understood by those skilled in the art that various modifications can be made to the combination of respective components or respective processes for processing, and that such modifications are also within the scope of the present disclosure. In the embodiments, the game is illustrated as a content, but the contents may include a moving image other than the game.

DESCRIPTION OF REFERENCE SIGNS

1 . . . Information processing system, 10 . . . Information processing apparatus, 100 . . . Processing section, 102 . . . Communicating section, 110 . . . Operation receiving section, 112 . . . Content image display section, 114 . . . Acquiring section, 116 . . . Chat executing section, 118 . . . Content executing section, 130 . . . System image display section, 140 . . . Menu display section, 142 . . . Chat information display section, 144 . . . Member display section, 146 . . . Chat list display section.

The invention claimed is:

1. An information processing apparatus comprising:
   a content image display section that displays a content image on a game screen of a user engaged in gameplay resulting from execution of an application game program; and
   a system image display section that displays a system image superimposed on the content image of the game screen, wherein the system image display section includes a chat information display section that causes the system image to include information regarding a voice chat, including:
   a chat icon superimposed over the content image of the game screen, where activation of the chat icon causes the system image to include a chat image superimposed over the content image of the game screen,
   the chat image including any currently activated chat room in which the user is currently engaged, where activation of the chat image causes the system image to include a chat window superimposed over the content image of the game screen, and
   the chat window including a selectable list of voice chat rooms for respective different game application programs from the application game program, where the user may select among the list of voice chat rooms and such selection causes the system image to change the chat window to display the selected chat room as currently active chat room and a list of members engaging in such currently active chat room.

2. The information processing apparatus according to claim 1, further comprising an operation receiving section that causes the system image display section to display the system image in response to an operation by the user.

3. The information processing apparatus according to claim 1, wherein, activation by the user of a specific area of the chat window during a time that the chat window is displaying the currently active chat room, causes the system image to cause the chat window to revert to the selectable list of voice chat rooms, where the user may again select among the list of voice chat rooms.

4. The information processing apparatus according to claim 3, wherein, user selection of another voice chat room among the list of voice chat rooms causes the system image to change the chat window to display the other selected chat room as a new currently active chat room and a list of members engaging in such new currently active chat room.

5. The information processing apparatus according to claim 1, further comprising:

a chat executing section that executes processing related to the voice chat, wherein the chat executing section activates only one voice chat room among a plurality of voice chat rooms in which the user stays.

6. An image display method for superimposing another image on a content image, the method comprising steps of:

displaying the content image on a game screen of a user engaged in gameplay resulting from execution of an application game program;

displaying a system image superimposed on the content image of the game screen, where the system image includes information regarding a voice chat, including:

a chat icon superimposed over the content image of the game screen, where activation of the chat icon causes the system image to include a chat image superimposed over the content image of the game screen, the chat image including any currently activated chat room in which the user is currently engaged, where activation of the chat image causes the system image to include a chat window superimposed over the content image of the game screen, and the chat window including a selectable list of voice chat rooms for respective different game application programs from the application game program, where the user may select among the list of voice chat rooms and such selection causes the system image to change the chat window to display the selected chat room as currently active chat room and a list of members engaging in such currently active chat room.

7. A non-transitory, computer readable storage medium containing a program, which when executed by a computer, causes the computer to perform an image display method by carrying out actions, comprising:

displaying the content image on a game screen of a user engaged in gameplay resulting from execution of an application game program;

displaying a system image superimposed on the content image of the game screen, where the system image includes information regarding a voice chat, including:

a chat icon superimposed over the content image of the game screen, where activation of the chat icon causes the system image to include a chat image superimposed over the content image of the game screen, the chat image including any currently activated chat room in which the user is currently engaged, where activation of the chat image causes the system image to include a chat window superimposed over the content image of the game screen, and the chat window including a selectable list of voice chat rooms for respective different game application programs from the application game program, where the user may select among the list of voice chat rooms and such selection causes the system image to change the chat window to display the selected chat room as currently active chat room and a list of members engaging in such currently active chat room.

* * * * *